United States Patent
Bey et al.

(10) Patent No.: US 8,024,146 B2
(45) Date of Patent: *Sep. 20, 2011

(54) MULTI-GAS FLOW SENSOR WITH GAS SPECIFIC CALIBRATION CAPABILITY

(75) Inventors: Paul Prehn Bey, Hilliard, OH (US); Richard Gehman, Hilliard, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,062

(22) Filed: Jul. 6, 2010

(65) Prior Publication Data

US 2010/0268485 A1    Oct. 21, 2010

Related U.S. Application Data

(63) Continuation of application No. 12/166,047, filed on Jul. 1, 2008, now Pat. No. 7,769,557.

(51) Int. Cl.
*G01F 25/00* (2006.01)

(52) U.S. Cl. ............ 702/100; 702/45; 702/50; 702/188; 73/1.34

(58) Field of Classification Search .................. 73/1.34, 73/861; 702/50, 100, 45, 188, 190
See application file for complete search history.

(56) References Cited

U.S. PATENT DOCUMENTS

| | | |
|---|---|---|
| 7,243,541 B1 | 7/2007 | Bey et al. |
| 7,277,802 B1 | 10/2007 | Dmytriw |
| 7,278,309 B2 | 10/2007 | Dmytriw et al. |
| 7,280,927 B1 | 10/2007 | Dmytriw |
| 7,467,547 B2 | 12/2008 | Oda et al. |
| 2007/0209433 A1 | 9/2007 | Gehman et al. |
| 2007/0271069 A1 | 11/2007 | Dmytriw et al. |
| 2007/0271070 A1 | 11/2007 | Dmytriw et al. |

FOREIGN PATENT DOCUMENTS

JP         2001174304        6/2001

*Primary Examiner* — Drew A Dunn
*Assistant Examiner* — Hien X Vo
(74) *Attorney, Agent, or Firm* — Seager, Tufte & Wickhem LLC

(57) ABSTRACT

A multi-gas/gas-mixture or liquid flow sensor apparatus utilizing a specific media calibration capability. The flow sensor can be coupled with an Application Specific Integrated Circuit (ASIC) that incorporates a signal conditioner and a memory module. The signal conditioner provides a high order calibration and signal processing of flow signals from the sensor to a processed signal output representative of the flow. The processed signal output can be stored in the memory module. A correction factor can be calculated and stored in the memory module in response to the stored values of the processed signal output, which tends to linearize the relationship between the flow rate and the processed signal output of a measuring system. The correction factor and/or the processed signal output provided by the signal conditioner can be utilized by the measuring system.

20 Claims, 2 Drawing Sheets

MULTI-GAS FLOW SENSOR WITH GAS SPECIFIC CALIBRATION CAPABILITY

This application is a continuation of U.S. patent application Ser. No. 12/166,047, filed Jul. 1, 2008, entitled "Multi-Gas Flow Sensor With Gas Specific Calibration Capability", and issued as U.S. Pat. No. 7,769,557, which is incorporated herein by reference.

TECHNICAL FIELD

Embodiments are generally related to sensor methods and systems. Embodiments are also related to combi sensors for measuring multiple measurands. Embodiments are additionally related to multi-gas flow sensors.

BACKGROUND OF THE INVENTION

Flow sensors are utilized in a variety of fluid-sensing applications for detecting the movement of fluids, which may be in gaseous (e.g., air) or liquid form. A gas mass flow sensor is one example of a flow sensor. Examples of gas sensing applications utilizing mass gas flow sensors include anesthesia gas mixers employed in medical applications, high-end welding equipment utilized in industrial applications, and gas chromatography detectors and controllers implemented in instrumentation applications. Typical sensor instrumentation utilized in such applications includes, for example, one or more simultaneous measurand to make calculations for sensor measurement. This is currently achieved by either using multiple sensors with different addresses or a single sensor with a complex system level calibration selection that utilizes a conditioning microcontroller or a PLC (Programmable Logic Controller).

Flow sensors inherently produce a nonlinear output signal in response to gaseous or liquid flow through the sensor. Such nonlinear output signals are dependent upon many factors, such as temperature coefficients of resistance with respect to the utilized sensing element, thermal transfer characteristics of the media being measured and the media of the transducer, and the mechanical dimensions of a flow path.

Signal conditioning circuits are often utilized as an interface in a signal conditioning unit to convert a basic flow signal received from a data source into a more usable output signal. Signal conditioning circuits can be utilized in association with flow sensors to receive a non-linear flow signal and convert the basic flow signal into an output voltage utilized by a control system. Application Specific Integrated Circuit (ASIC) components have been developed for conditioning sensor input signals and such ASIC's offer a wide variety of programming options that can be specifically tailored to match the characteristics of the particular sensor technology.

The majority of prior art sensing applications possess limited sensing and signal conditioning capabilities. Such sensing applications utilize multiple sensors, complex calibration routines and expensive micro-controllers/PLCs to condition basic flow signals from the sensor, regardless of the quantity being measured by the sensor. This approach results in a complex system calibration, which leads to an increase in processing time and often produces inaccurate results. Additionally, the installation costs for packaging individual sensors for such application increases, which further enlarges the size of the final sensor package.

Based on the foregoing it is believed that a need exists for an improved multi-gas flow sensor utilizing a combi sensor with gas calibration capability as described in greater detail herein. A need also exists for an improved signal conditioning circuit that is capable of conditioning the basic flow signal output from different types of sensors.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor method and apparatus.

It is another aspect of the present invention to provide for an improved combi sensor apparatus for measuring multiple measurands in a common package.

It is a further aspect of the present invention to provide for an improved multi-gas flow sensor utilizing a combi sensor with gas specific calibration capability.

The aforementioned aspects and other objectives and advantages can now be achieved as described herein. A multi-gas flow sensor apparatus and method is disclosed herein, which includes the use of a combi sensor with gas calibration capabilities. The combi sensor can be coupled with a conditioning microcontroller that incorporates a signal conditioner and a memory module. The signal conditioner provides a high order calibration and signal processing of flow signals from the combi sensor to a processed signal output representative of the flow. The processed signal output can be stored in the memory module. A correction factor can be calculated and stored in the memory module in response to the stored values of the processed signal output, which tend to linearize the relationship between the flow rate and the processed signal output of a measuring system. The correction factor and/or the processed signal output provided by the signal conditioner can be utilized by the measuring system.

The combi sensor includes a number of varying types of sensors that provide multiple sensing measurands for sensing operations. The ASIC memory and the signal conditioner can be connected to a number of varying types of sensors. The ASIC stores calibration data and sensor related information utilizing the memory for each of the connected measurand transducers.

Additional correction factors to the processed signal outputs can be utilized depending on the measuring system, which require changes when the gas type also changes. Important measurands for accurately calculating the mass flow of different gases is: which gas is in the flow channel, the absolute temperature and the barometric pressure. Humidity can also be processed and may be used in the further calculations of the gas mass flow. The combi sensor output is provided to a conditioning microcontroller where the information can be processed into an accurate output signal for specific gas output. The multi-gas flow sensor with gas specific calibration disclosed herein can therefore provide a calibrated coarsely conditioned signal output for various known gases.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
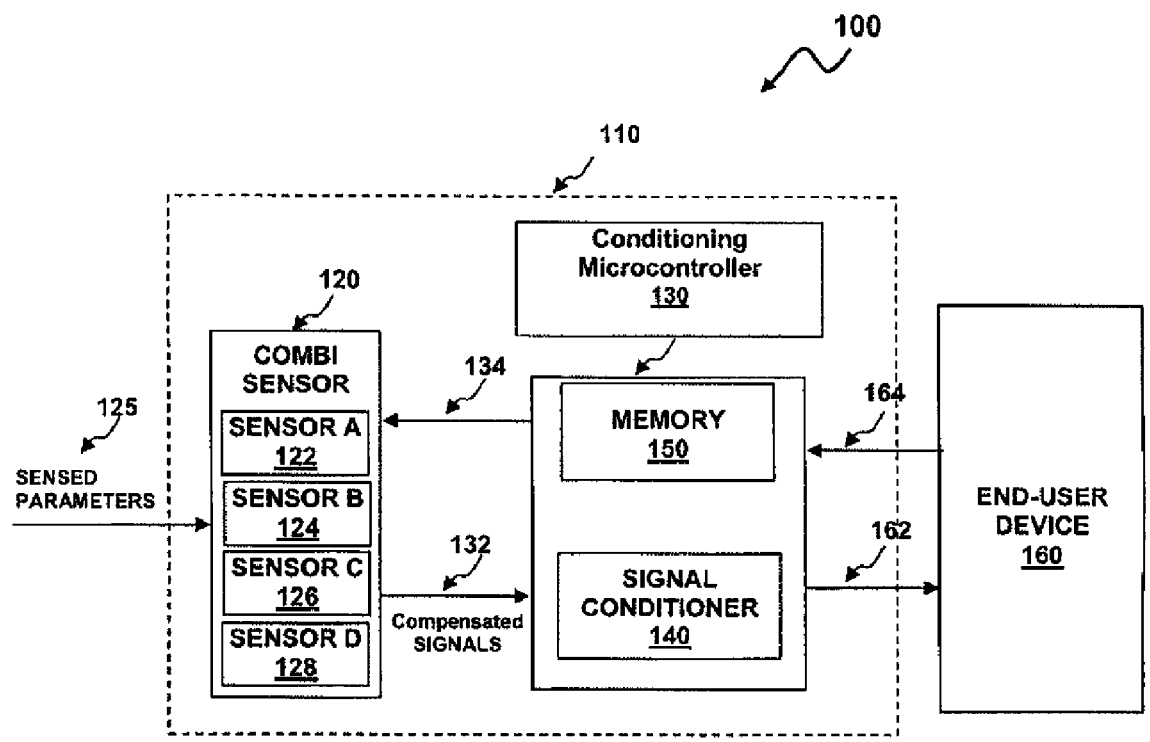
FIG. 1 illustrates a block diagram of a multi-gas flow sensor, which can be utilized for providing a calibrated and accurately conditioned output, in accordance with a preferred embodiment.

FIG. 1 illustrates a block diagram 100 of a flow sensor apparatus 110, which can be utilized for providing a calibrated gas/gas-mixture or liquid specific conditioned output, in accordance with a preferred embodiment. The flow sensor apparatus 110 is connected to one or more flow sensors within sensed parameters 125 and contains sensor processing ability. The flow sensor apparatus 110 is also connected to the end-user device 160. The flow sensor apparatus 110, in one embodiment, can be implemented as an Application Specific Integrated Circuit (ASIC) "combi sensor" apparatus 120 and a conditioning microcontroller 130 comprised of a signal conditioner 140 and non-volatile memory 150. It is important to note, however, that a combi sensor represents merely one possible implementation. For purposes of discussion and of providing an illustrative example, the disclosed embodiments provide an example of a combination sensor. Note that the term "combi sensor" as utilized herein generally refers to a combination sensor that often incorporates one or more sensor transducers, such as, for example, mass flow, pressure, temperature and humidity.

The flow sensor apparatus 120 can be configured to include a number of varying types of sensors 125 processed by the combi sensor ASIC 120 within functional compensation blocks for each measurand 122, 124, 126 and 128 that can provide compensated outputs for the multiple sensing measurands for sensing operations. The conditioning microcontroller 130 further includes a signal conditioner 140 with associated memory 150. The combi sensor ASIC 120 senses environmental parameters 125 such as airflow, pressure, temperature and humidity in order to provide compensated measurand signals 132, which are each in the presence of the non-linear response to the gas/gas mixture or liquid mass flow through the combi sensor 125. Such an output signal is dependent upon many factors such as temperature coefficients, thermal transfer characteristics of the media being measured and the media of the transducer, and the mechanical dimensions of the flow path. The basic flow signals can be conditioned and calibrated by the signal conditioner 140 associated with the ASIC 130.

The compensated measurand signals generally correspond to the parameters 125 sensed by the combi sensor 120. The conditioning microcontroller 130 feeds-back coefficients to the combi sensor 120 based on information about the gas/gas-mixture or liquid being sensed. The signal conditioner 140 uses the conditioned measurands from the combi sensor 120 and uses calculations to provide a processed output signal 160. Coefficients to generate the processed output signal 160 can also be stored in the memory 150. Information pertaining to the gas/gas-mixture or liquid flow is generally provided by an end-user device. A correction factor can be calculated and stored in the memory 150 based on the stored values of the processed signal output 160, which will tend to linearize the relationship between the flow rate and the processed signal output 160 of a measuring system.

The memory 150 comprises a rewritable nonvolatile memory, an EEPROM (Electrically Erasable Programmable Read Only Memory) or flash EPROM; however, other rewritable ROMs may also be used. The conditioning microcontroller 130 can be utilized to store and provide flow-specific coefficients 134 and pertinent sensor related information to one or more of the sensors 122, 124, 126 and 128 utilizing the EEPROM 150. In general, conditioning microcontroller 130 can be implemented as an ASIC that is designed essentially from "scratch" for a specific application. ASIC IC's are specially designed chips that provide unique functions. ASIC IC's can replace general-purpose commercial microcontroller IC's and integrate several functions or logic control blocks into one single chip, lowering manufacturing cost and simplifying circuit board design. It can be appreciated that other types of ASIC devices may also be utilized to implement signal-conditioning ASIC 130, depending upon design considerations.

The memory 150 stores flow-specific information 164 provided from the end-user device 160 by an end-user to perform particular tasks. End-user device 160 can include, for example, a microprocessor utilized by the end-user to analyze, store, and otherwise utilize the data from the flow sensor apparatus. The microprocessor may be dedicated for that purpose; more typically the microprocessor will be part of a larger measuring system that uses the analyzed data for some other purpose, (e.g., a patient monitor used for monitoring the breathing, temperature, and heart rate of a hospital patient). The flow-specific information 164 or the processed signal output 162 can be utilized depending on the measuring systems, which require changes when gas/gas-mixture or liquid type changes.

Figure 2:
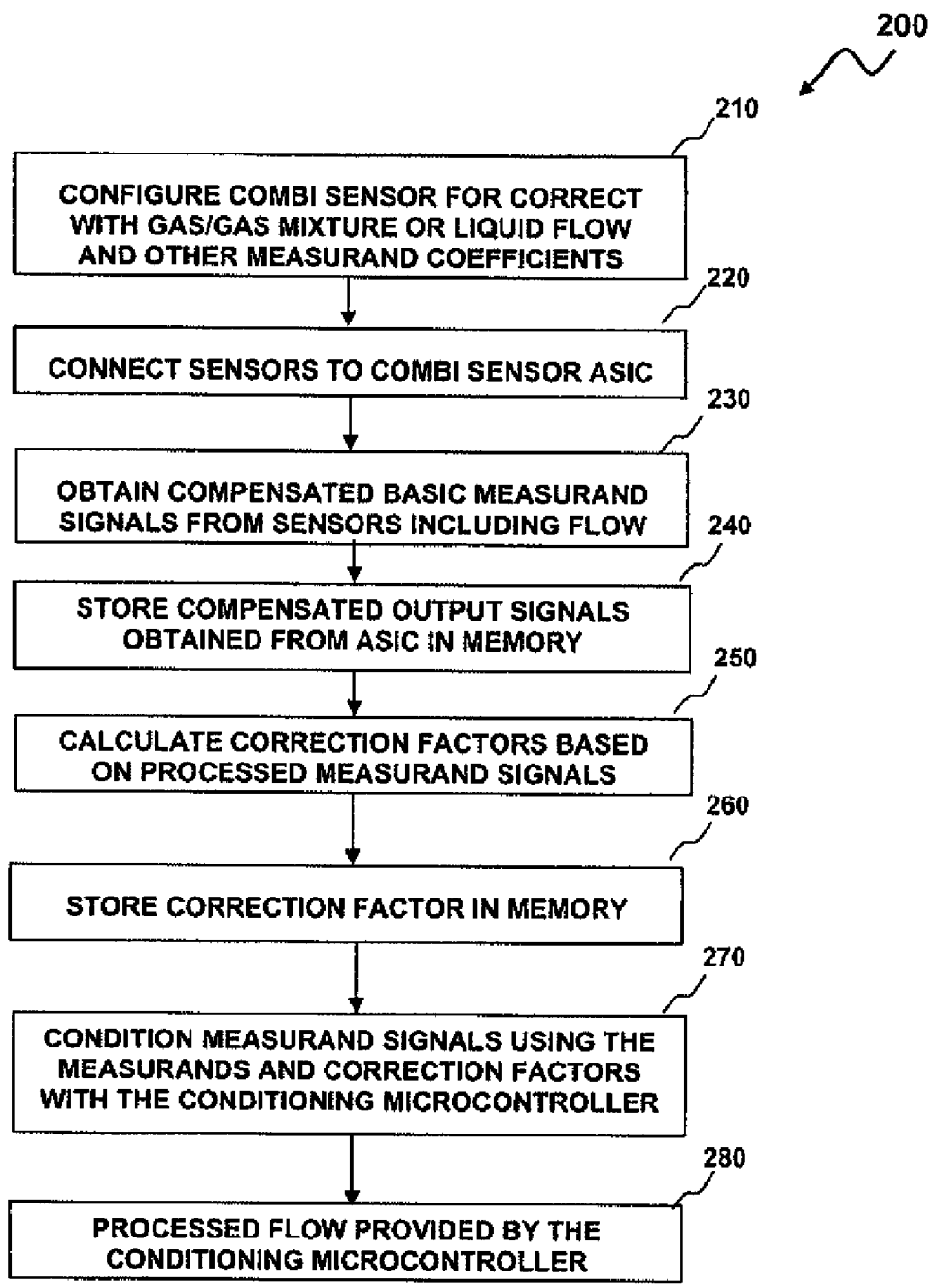
FIG. 2 illustrates a flow chart of operations illustrating operational steps of a method for providing high order calibration and signal processing of the multi-gas flow sensor output signal, in accordance with a preferred embodiment.

FIG. 2 illustrates a high-level flow chart of operations illustrating operational steps of a method 200 for providing high order calibration and signal processing of the multi-gas or liquid flow sensor output signal in accordance with a preferred embodiment. Note that in FIGS. 1-2, identical or similar blocks are generally indicated by identical reference numerals. The combi sensor 120 can be configured, as depicted at block 210 based on gas/gas-mixture or liquid flow information 164 through the measurand specific coefficients 134. The varying types of sensors in environmental parameters 125 input into the combi sensor ASIC 120 with compensation modules 122, 124, 126 and 128 can include one or more of the following types of sensors: a flow sensing element, a pressure sensing element, a temperature sensing element and/or a humidity sensing element.

The present invention is particularly useful where at least one of the sensor-transducers associated with the combi sensor 120 is sensing parameter(s) that result(s) in a highly non-linear output, such as a sensor transducer that is sensing the gas/gas-mixture or liquid flow. The combi sensor ASIC utilizes measurand coefficients 134 provided from the conditioning microcontroller 130. Thereafter, the combi sensor 120 can be electrically connected to a conditioning microcontroller 130 that includes a signal conditioner 140 and memory 150, as illustrated at block 220. Next, the basic flow signals and environmental parameters 132 can be obtained from sensed parameter(s) 125 utilizing the combi sensor 120, as depicted at block 230 and stored in memory 240.

Correction factors can be calculated 250 and stored in memory 260 based on the compensated parameter signals 132 which are stored in the memory and further processed and calibrated by the conditioning microcontroller 130. The flow output signal 162 is generated using all of the compensated measurand signals and correction factors, as illustrated at block 270. The processed flow output signal is provided to the end-user device by the conditioning microcontroller 280. It is believed that by utilizing the multi-gas/gas-mixture or liquid flow sensor apparatus 110 as described herein, the sensed parameters can be conditioned to provide a fine and processed output utilizing a single package that is very small in size and cost effective.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A mass flow sensor apparatus for sensing a mass flow rate of a fluid traveling down a flow channel, wherein the fluid is a known fluid type of two or more fluid types each having different fluid characteristics, comprising:
  a mass flow sensor for sensing the mass flow rate of the fluid traveling down the flow channel, the mass flow sensor providing a mass flow rate signal;
  a non-volatile memory storing:
    a first set of coefficients that correspond to a first fluid type of the two or more fluid types;
    a second set of coefficients that correspond to a second fluid type of the two or more fluid types, wherein the first set of coefficients are different from the second set of coefficients; and
  a controller that:
    reads the first set of coefficients from the non-volatile memory and compensates the mass flow rate signal using the first set of coefficients when the first fluid type is traveling down the flow channel; and
    reads the second set of coefficients from the non-volatile memory and compensates the mass flow rate signal using the second set of coefficients when the second fluid type is traveling down the flow channel.

2. The mass flow sensor apparatus of claim 1, wherein the mass flow rate signal is at least partially compensated before the controller compensates for fluid type via the first set of coefficients or the second set of coefficients.

3. The mass flow sensor apparatus of claim 1, wherein the mass flow rate signal is at least partially compensated after the controller compensates for fluid type via the first set of coefficients or the second set of coefficients.

4. The mass flow sensor apparatus of claim 1, wherein the mass flow sensor and the non-volatile memory are situated in a common sensor package.

5. The mass flow sensor apparatus of claim 4, wherein the controller is situated in the common sensor package.

6. The mass flow sensor apparatus of claim 4, wherein the controller is part of an End-User device separate from the common sensor package.

7. The mass flow sensor apparatus of claim 1, further comprising a plurality of other sensors, each of the plurality of other sensors sensing a different property of the fluid traveling down the flow channel.

8. The mass flow sensor apparatus of claim 7, wherein at least selected sensors of the plurality of other sensors have a corresponding first set of coefficients and a corresponding second set of coefficients stored in the non-volatile memory.

9. A sensor apparatus for sensing a property of a fluid traveling down a flow channel, wherein the fluid is a known fluid type of two or more fluid types each having different fluid characteristics, the sensor apparatus comprising:
  a sensor for sensing the property of the fluid traveling down the flow channel;
  a non-volatile memory storing:
    a first set of coefficients that correspond to a first fluid type of the two or more fluid types;
    a second set of coefficients that correspond to a second fluid type of the two or more fluid types, wherein the first set of coefficients are different from the second set of coefficients; and
  the sensor and the non-volatile memory are situated in a common sensor package.

10. The sensor apparatus of claim 9, wherein said sensor provides a signal related to the property of the fluid traveling down the flow channel, and wherein:
  said first set of coefficients, once read from the non-volatile memory, are used to compensate the signal when the first fluid type is traveling down the flow channel; and
  said second set of coefficients, once read from the non-volatile memory, are used to compensate the signal when the second fluid type is traveling down the flow channel.

11. The sensor apparatus of claim 10 further comprising a controller that:
  reads the first set of coefficients from the non-volatile memory and compensates the signal using the first set of coefficients when the first fluid type is traveling down the flow channel; and
  reads the second set of coefficients from the non-volatile memory and compensates the signal using the second set of coefficients when the second fluid type is traveling down the flow channel.

12. The sensor apparatus of claim 11, wherein the signal is at least partially compensated before the controller compensates the signal for fluid type via the first set of coefficients or the second set of coefficients.

13. The sensor apparatus of claim 11, wherein the signal is at least partially compensated after the controller compensates the signal for fluid type via the first set of coefficients or the second set of coefficients.

14. The sensor apparatus of claim 11, wherein the controller is situated in the common sensor package.

15. The sensor apparatus of claim 11, wherein the controller is part of an End-User device situated outside of the common sensor package.

16. The sensor apparatus of claim 9 further comprising a plurality of sensors, each of the plurality of sensors sensing a different property of the fluid traveling down the flow channel.

17. The sensor apparatus of claim 16, wherein at least selected sensors of the plurality of sensors have a corresponding first set of coefficients and a corresponding second set of coefficients stored in the non-volatile memory.

18. A method for providing a measure related to a property of a fluid traveling down a flow channel, wherein the fluid is a known fluid type of two or more fluid types each having different fluid characteristics, the method comprising:
  sensing the property of the fluid traveling down the flow channel using a sensor, and providing a signal related to the property of the fluid traveling down the flow channel;
  compensating the signal for fluid type by:
    identifying if a first fluid type is traveling down the flow channel or if a second fluid type is traveling down the flow channel;

if the first fluid type is traveling down the flow channel, reading a first set of coefficients from a non-volatile memory, and compensating the signal using the first set of coefficients; and if the second fluid type is traveling down the flow channel, reading a second set of coefficients from the non-volatile memory, and compensating the signal using the second set of coefficients; and providing a compensated output signal that is related to the property of the fluid traveling down the flow channel.

19. The method of claim 18, wherein the sensor and the non-volatile memory are situated in a common sensor package.

20. The method of claim 18, wherein the identifying step identifies if a first fluid type is traveling down the flow channel or if a second fluid type is traveling down the flow channel by receiving a fluid type input signal.

* * * * *